ically introducing silver and copper ions into the glass surface in exchange for sodium ions. Briefly, the practice involves preparing a homogeneous staining paste that contains, as active ingredients, compounds of silver and copper, and applying this paste uniformly to the glass surface to be stained. The paste coating is then dried and the coated glass heated to a temperature somewhat above the glass annealing point, but well below the softening point, e.g. about 550° C. for a commercial soda-lime bulb glass. The coated glass is held at this temperature for a period of about one hour to produce a medium dark amber color in the surface.

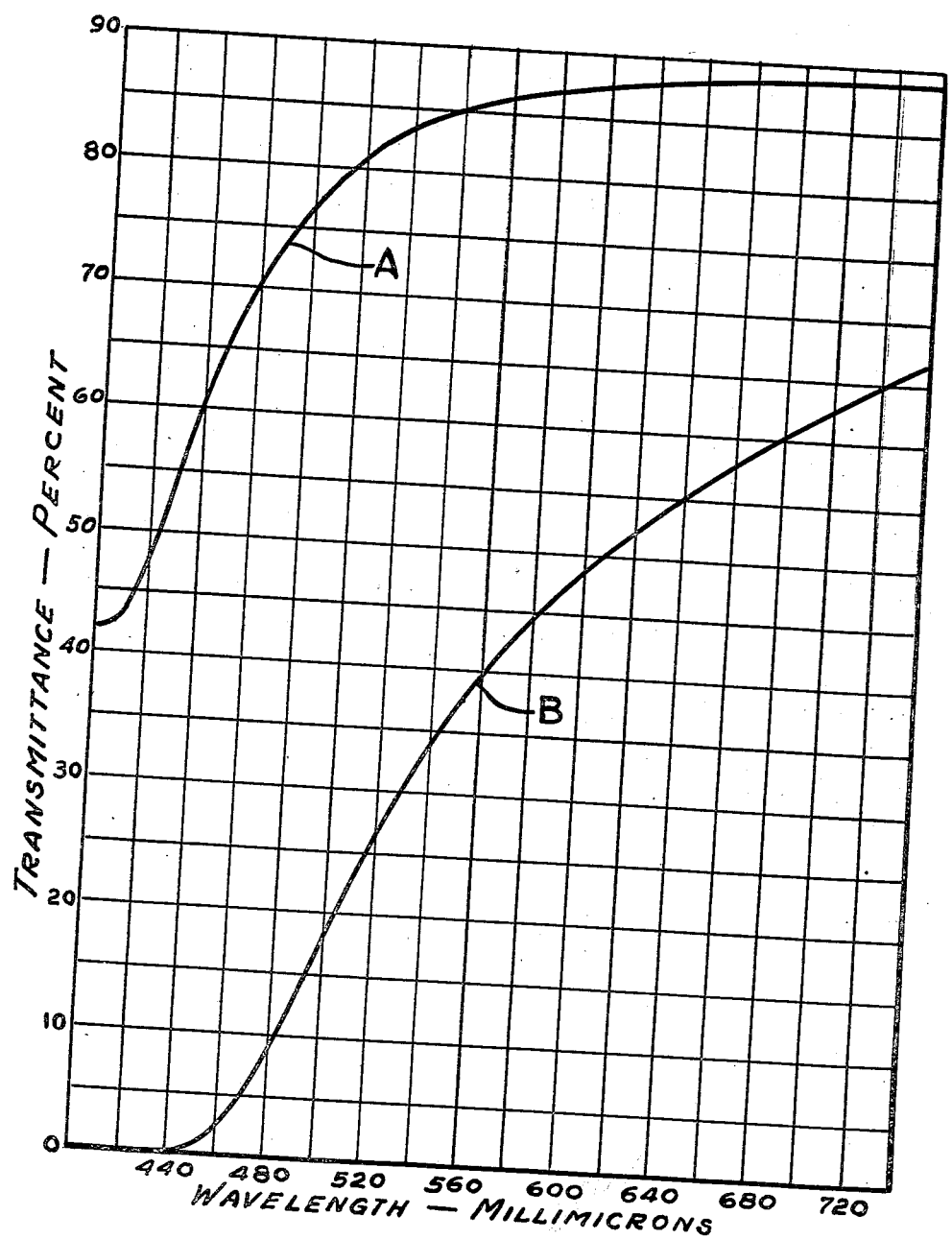

It is customary to use silver and copper sulfides as the active staining compounds, and to mill these compounds with an inert carrier and water to form the paste. However, other copper and silver salts, such as the nitrates, chlorides, and oxides, have also been employed, usually with an addition of sulfur to the staining paste.

We have now discovered that the rate of ion exchange in this copper-silver staining process may be greatly accelerated by the presence of a small amount of a lithium salt in the staining paste. We have further found that this unusual effect of a lithium salt addition is particularly pronounced with lower silver-copper ion ratios than heretofore considered practical. As a result of these discoveries we have found that a highly desirable dark amber color can be produced in the surface of a soda-lime glass at considerably lower times and temperatures, as well as with a lower silver content paste, than previously employed for this type of staining.

Our invention is an improved method of exchanging a combination of silver and copper ions from a paste for sodium ions from a glass surface wherein the improvement consists in providing lithium ions in the staining paste in an amount not exceeding 15 mole percent of the total amount of the copper and silver ions in the paste. The invention further resides in the improved staining paste to be used in the process.

Heretofore, silver-copper staining pastes, adapted to produce amber stains, have usually contained approximately equal amounts of silver and copper ions in a compound form. It was recognized, however, that the depth of color for given staining conditions decreased, and tended to become a pale yellow or green, as the ratio of silver to copper in the paste decreased. Accordingly, where a light stain was desired, a somewhat lower ratio of silver to copper might be employed.

In contrast, we now find it desirable with our improved staining method to use a relatively low ratio of silver to copper ions in the staining paste, for example a ratio of about 1:10 being quite satisfactory for the production of medium dark amber colors. While not generally necessary, higher concentrations of silver ions may be employed, particularly for very high silver ion content in the glass surface, while still benefiting from the accelerating effect of lithium ions. The silver to copper ion ratio may also be as low as about 1:100 while still obtaining benefits of our improvement.

As little as one-half percent of lithium ion content, calculated on a mole basis as a percentage of the total silver plus copper ion concentration, may be effective for present purposes. However, the effectiveness progressively increases with higher concentrations of lithium ion, and we prefer to have at least 5% present. While the accelerating effectiveness of the lithium ion continues to increase with amounts greater than about 15 mole percent, there is a tendency for surface crazing of the glass to develop with such higher ion concentrations in the staining paste. The lithium ion may be present in the paste in various compounds, but we have found lithium nitrate a particularly convenient material to use.

The new staining paste may be prepared in conventional manner. It need differ from prior pastes only in the presence of lithium ions, that is a source of such ions, in the paste. Thus, conventional silver and copper staining compounds, preferably the sulfides, may be mixed with inert carriers or diluents such as barium carbonate and ochre, a vehicle such as water, and the desired addition of lithium compounds. This mixture may then be milled in the usual manner to provide a homogeneous suspension of the solids, that is the staining paste. It is customary to apply the staining paste by spraying over the glass surface to provide an even coating. Alternatively a glass article may be dipped in the staining paste. Also, the paste may be modified to permit brushing or silk screen application, particularly where only a portion of the glass surface is to be stained.

The paste-coated glass is then dried and heated to an elevated temperature to effect the desired ion exchange. In accordance with prior practice and pastes, a medium dark amber color has required a paste containing about equal amounts of copper and silver ions, a heat treatment time of about one hour, and a temperature intermediate the glass annealing and softness points, usually about 40° C. above the annealing temperature. In using our improved staining paste, we find that a similar degree of color, and hence ion exchange, is achieved with a staining time of about ten minutes, and a temperature of about 100° C. lower than prior staining temperatures. For example, a temperature of about 450° C. is satisfactory for a commercial soda-lime glass used in incandescent bulb production.

This staining temperature will be about 30 to 40° C. below the strain point of the glass. The terms "annealing point," "softening point," and "strain point" (or temperature) are used in accordance with A.S.T.M. definitions of these terms. The amount of ion exchange increases with an increase in either staining temperature or time. However, with appreciably longer times or higher temperatures, a tendency for crazing to occur in the glass surface also appears.

The following specific example, described with reference to the accompanying drawing, is presented to more fully illustrate the improvement of our invention.

A group of R–40 lamp bulbs were blown from a commercial soda-lime glass composed of about 73% $SiO_2$, 17% $Na_2O$, 5% $CaO$, 3% $MgO$ and 2% other conventional glass making oxides ($Al_2O_3$, $B_2O_3$, $K_2O$, etc.). The bulbs were divided into two separate lots with each lot being spray coated with a staining paste having one of the following compositions:

|  | A | B |
|---|---|---|
| $Ag_2S$ grams | 1 | 1 |
| CuS do | 15 | 15 |
| $LiNO_3$ do | | 10 |
| $BaCO_3$ do | 30 | 20 |
| ochre do | 54 | 54 |
| water cc | 75 | 75 |

The pastes were prepared by milling and applied by spraying in accordance with conventional staining practice, the processing conditions being maintained as nearly identical as possible with the two pastes.

Each of the paste-coated groups of bulbs was then fired at a temperature of 450° C. for a period of ten minutes in a sulfur dioxide atmosphere. Following this the bulbs were cooled and the staining paste residue removed. The bulbs stained with the lithium-free paste had a very pale amber surface coloration. In contrast, the bulbs stained with staining paste B, the paste containing lithium nitrate, had a medium dark amber color that was particularly suitable for display lamp purposes. Spectrophotometric curves were obtained for a representative bulb selected from each lot. These curves are shown in the accompanying drawing. The curve for the bulb stained with staining paste A is indicated with a corresponding "A" and the curve for the bulb stained with staining paste B is correspondingly identified as "B." In the drawing percentage transmittance is plotted for the wave lengths across the visible portion of the spectrum, that is from about 400 to about 750 millimicrons. As would be expected, curve B, representing the medium dark amber color, has a considerably lower transmittance than does curve A.

Subsequently, a sufficient amount of surface glass was removed from a representative bulb of each lot to essentially remove all glass within which ion exchange had occurred. Chemical analysis of this removed surface glass indicated that the glass removed from the darker color bulb contained about twice as much silver ion and about five times as much copper as the lighter stained glass. This indicates a preferential acceleration of copper ion exchange from the mixed ion paste. However, we have not found any evidence of acceleration of either copper or silver ion exchange in the absence of the other.

What is claimed is:

1. In a method of exchanging a combination of silver and copper ions from a staining paste for sodium ions from a glass surface, the improvement which consists in providing a source of lithium ions in the staining paste, the amount of lithium ions present in the paste being from about 0.5 to about 15 mole percent of the total amount of copper and silver ions in the paste.

2. A method in accordance with claim 1 wherein the ion exchange is effected to an elevated temperature below the strain point of the glass and for a time not exceeding about 30 minutes.

3. A method in accordance with claim 1 wherein the ion exchange is effected at a temperature of about 20° C. below the glass strain point and a staining time of about 10 minutes.

4. An improved glass staining paste containing in combination sources of silver, copper, and lithium ions, the content of lithium ions being from about 0.5 to about 15% of the total content of silver plus copper ions on a mole basis.

5. A staining paste in accordance with claim 4 wherein the ratio of silver to copper ions is about 1:10.

References Cited in the file of this patent
UNITED STATES PATENTS

| 2,662,035 | Levi | Dec. 8, 1953 |
| 2,662,036 | Levi | Dec. 8, 1953 |
| 2,662,037 | Levi | Dec. 8, 1953 |
| 2,701,215 | Kroeck | Feb. 1, 1955 |
| 2,779,136 | Hood et al. | Jan. 29, 1957 |